(12) United States Patent
Pak et al.

(10) Patent No.: US 9,017,852 B2
(45) Date of Patent: Apr. 28, 2015

(54) SECONDARY BATTERY

(71) Applicant: Samsung SDI Co., Ltd., Yongin-si, Gyeonggi-do (KR)

(72) Inventors: Ki-Sik Pak, Yongin-si (KR); Ki-Sung Hong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 49 days.

(21) Appl. No.: 13/772,151

(22) Filed: Feb. 20, 2013

(65) Prior Publication Data

US 2013/0230767 A1 Sep. 5, 2013

Related U.S. Application Data

(60) Provisional application No. 61/606,084, filed on Mar. 2, 2012.

(51) Int. Cl.
*H01M 2/18* (2006.01)
*H01M 2/02* (2006.01)
*H01M 2/04* (2006.01)

(52) U.S. Cl.
CPC .......... *H01M 2/0207* (2013.01); *H01M 2/0267* (2013.01); *H01M 2/0413* (2013.01); *H01M 2/0408* (2013.01); *H01M 2/021* (2013.01); *H01M 2/0212* (2013.01)

(58) Field of Classification Search
CPC . H01M 2/0207; H01M 2/021; H01M 2/0212; H01M 2/0267; H01M 2/0408; H01M 2/04013; Y02E 60/12
USPC ........... 429/78, 129, 130, 139, 163, 167, 171, 429/174, 176, 177, 184, 185
See application file for complete search history.

(56) References Cited

U.S. PATENT DOCUMENTS

2005/0142439 A1* 6/2005 Lee et al. .................. 429/163
2007/0154794 A1 7/2007 Kim et al.

(Continued)

FOREIGN PATENT DOCUMENTS

JP 2001-250586 A 9/2001
JP 2008-041494 A 2/2008

(Continued)

OTHER PUBLICATIONS

European Office action dated Jul. 2, 2013 of the European Patent Application No. 13157182.0 corresponding to U.S. Appl. No. 61/606,084 and U.S. Appl. No. 13/772,151.

*Primary Examiner* — Patrick Ryan
*Assistant Examiner* — Ben Lewis
(74) *Attorney, Agent, or Firm* — Robert E. Bushnell, Esq.

(57) ABSTRACT

A secondary battery includes an electrode assembly including a pair of electrodes separated from each other by a separator, a battery case including a front portion bonded to a back portion to produce wing portions at opposite edges of the battery case, the electrode assembly being arranged within an accommodating portion of the battery case, the accommodating portion being arranged between the wing portions, an insulating member arranged at each of said wing portions of the battery case and a bonding portion arranged at each of said wing portions to attach said wing portions to the accommodating portion of the battery case. The bonding portion may be a double sided tape and may be integrally provided with the insulating member to simplify manufacturing process thereof.

18 Claims, 7 Drawing Sheets

(56) References Cited

U.S. PATENT DOCUMENTS

| | | |
|---|---|---|
| 2009/0023058 A1 | 1/2009 | Kim |
| 2009/0258290 A1 | 10/2009 | Lee et al. |
| 2010/0003594 A1 | 1/2010 | Hong et al. |
| 2011/0091764 A1 | 4/2011 | Kim |

FOREIGN PATENT DOCUMENTS

| | | |
|---|---|---|
| KR | 1020040107868 | 12/2004 |
| KR | 1020070071247 | 7/2007 |
| KR | 10-0770097 B1 | 10/2007 |
| KR | 1020100071814 | 6/2010 |

* cited by examiner

SECONDARY BATTERY

CLAIM OF PRIORITY

This application makes reference to, incorporates the same herein, and claims all benefits accruing under 35 U.S.C. §119 from an application earlier filed in the U.S. Patent and Trademark Office on the 2 Mar. 2012 and there duly assigned Ser. No. 61/606,084.

BACKGROUND OF THE INVENTION

1. Field of the Invention

An aspect of the present invention relates to a secondary battery, and more particularly, to a pouch-type secondary battery having improved safety, improved appearance, and easy to manufacture.

2. Description of the Related Art

Recently, secondary batteries have been variously used as power sources of portable electronic devices. As portable electronic devices are used in various fields, a demand on secondary batteries rapidly increases. The secondary battery is rechargeable and thus can be used many times. Therefore, the secondary battery is economically and environmentally effective, and thus the use of the secondary battery is being promoted.

On the other hand, a material such as lithium having high reactivity is included within the secondary battery, and therefore, the safety of the secondary battery may be problematic in the handling of the secondary battery. Accordingly, various studies have been conducted to improve the safety of the secondary battery.

SUMMARY OF THE INVENTION

Embodiments provide a secondary battery having improved safety by employing a new member.

Embodiments also provide a secondary battery having improved productivity by simplifying a manufacturing process and decreasing a failure rate.

According to an aspect of the present invention, there is provided a pouch-type secondary battery that includes an electrode assembly including a pair of electrodes separated from each other by a separator, a battery case including a front portion bonded to a back portion to produce wing portions at opposite edges of the battery case, the electrode assembly being arranged within an accommodating portion of the battery case, the accommodating portion being arranged between the wing portions, an insulating member arranged at each of said wing portions of the battery case and a bonding portion arranged at each of said wing portions to attach said wing portions to the accommodating portion of the battery case. The bonding portion may be integrally provided with the insulating member.

Each wing portion of the battery case may have a first side facing the accommodating portion and a second and opposite side facing away from the accommodating portion, the insulating member may cover both the first and second sides. The bonding portion may be arranged between the first side of the wing portion and the accommodating portion of the battery case. The insulating member may be a single integrated unit. The insulating member may include a first portion that covers the first side of the wing portion, a second portion that covers an entirety of the second side of the wing portion and a buffer portion arranged over an edge portion of the wing portion and being connected to each of the first and second portions at fold lines. The insulating member may instead include a first portion that covers the first side of the wing portion, a second portion that covers only a portion of the second side of the wing portion and a buffer portion arranged over an edge portion of the wing portion and being connected to each of the first and second portions at fold lines. A size of the bonding portion may correspond to a size of each of the first side of the wing portion and the first portion of the insulating member.

The insulating member may also include a third portion extending from the buffer portion in a direction opposite to that of the wing portion and may be arranged on the accommodating portion of the battery case. The battery may also include electrode tabs extending to an outside of the battery case and being electrically connected each of ones of electrode plates of the electrode assembly and lead films arranged around a portion of the electrode tabs that extend through the battery case to electrically insulate the electrode tabs from the battery case. Each of the front portion and the back portion may be a laminate including a metal layer arranged between two resin layers. The bonding portion may be a double sided tape having an adhesive on both sides. The insulating member may be a tape having an adhesive on only one side.

According to another aspect of the present invention, there is provided a method of making a pouch-type rechargeable battery, including preparing an electrode assembly by laminating an electrode on each side of a separator, preparing front and back portions of a battery case, the back portion having an accommodating portion, inserting the electrode assembly and an electrolyte into the accommodating portion, sealing the electrode assembly within by thermally bonding edge portions of the front portion to edge portions of the back portion to produce wing portions, providing a pair of integrated tape members, attaching the pair of integrated tape members to respective wing portions of the battery case and attaching the wing portions of the battery case to the accommodating portion of the battery case by folding the wing portions having the integrated tape members arranged thereon towards the accommodating portion.

The providing the pair of integrated tape members may include providing a pair of insulating members, forming first and second portions for each insulating member by folding each insulating member along fold lines and attaching bonding portions to the first portions of each insulating member. The bonding portion may be a double sided tape having an adhesive on both sides and the insulating member may be a tape having an adhesive on only one side. The method may also include attaching a third portion of each insulating member to the accommodating portion of the battery case. The method may also include attaching lead films to electrode tabs of the electrode assembly prior to said thermal bonding. A size and a shape of each bonding layer and the first portion of each insulating member may be a same as a size and a shape of each wing portion of the battery case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments of the present invention will be described with reference to the accompanying drawings.

Figure 1:
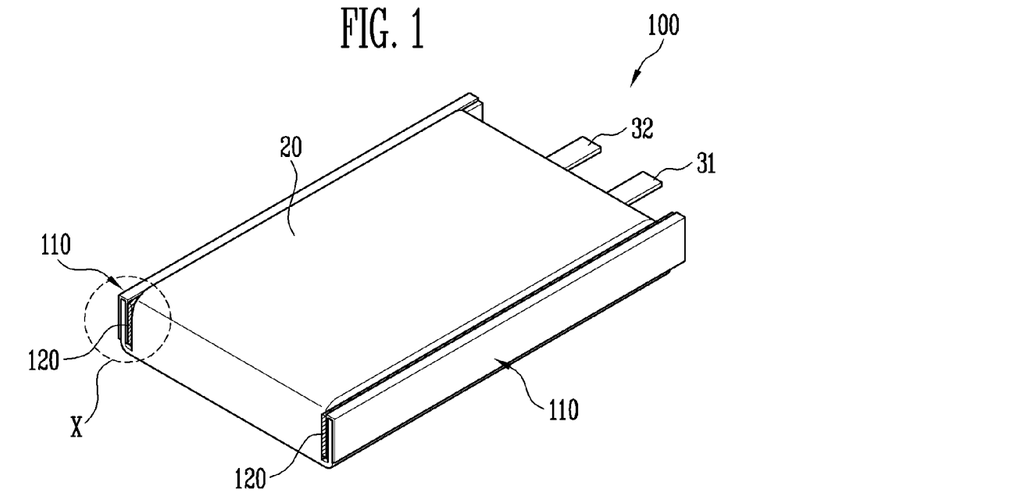
FIG. 1 is a perspective view of a pouch-type secondary battery according to a first embodiment of the present invention.
Figure 2:
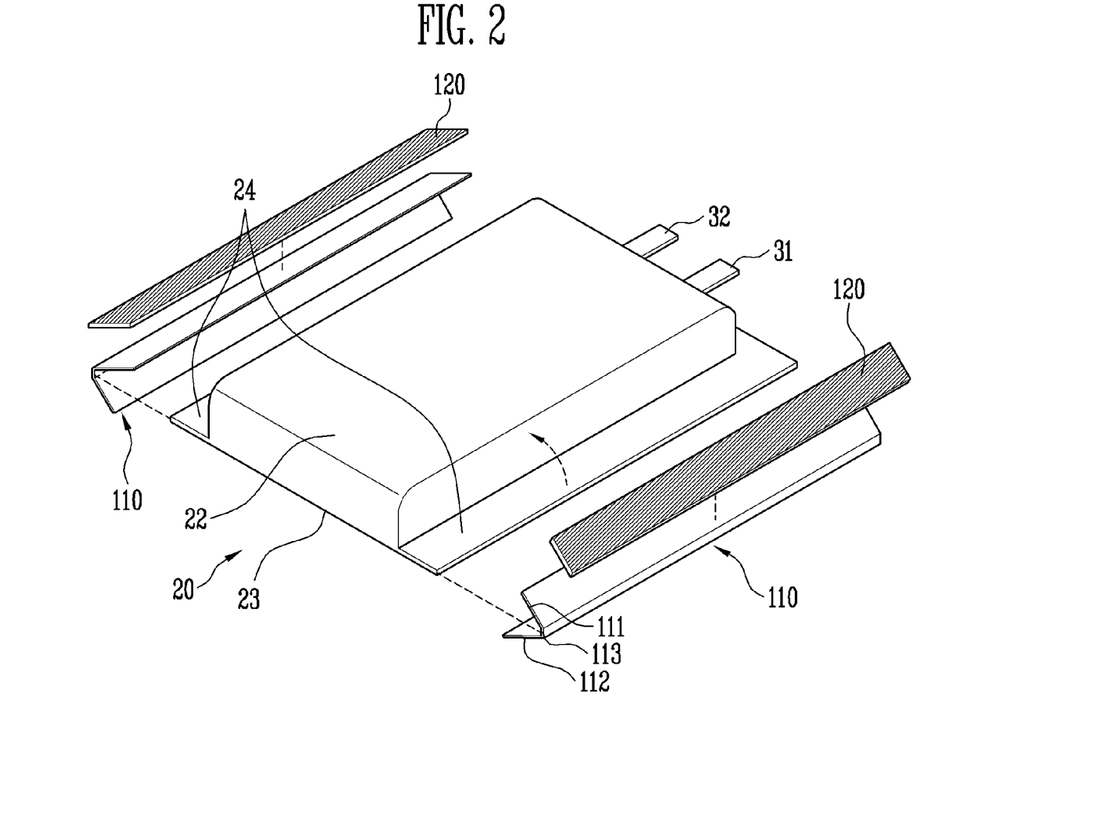
FIG. 2 is an exploded perspective view of FIG. 1.
Figure 3:
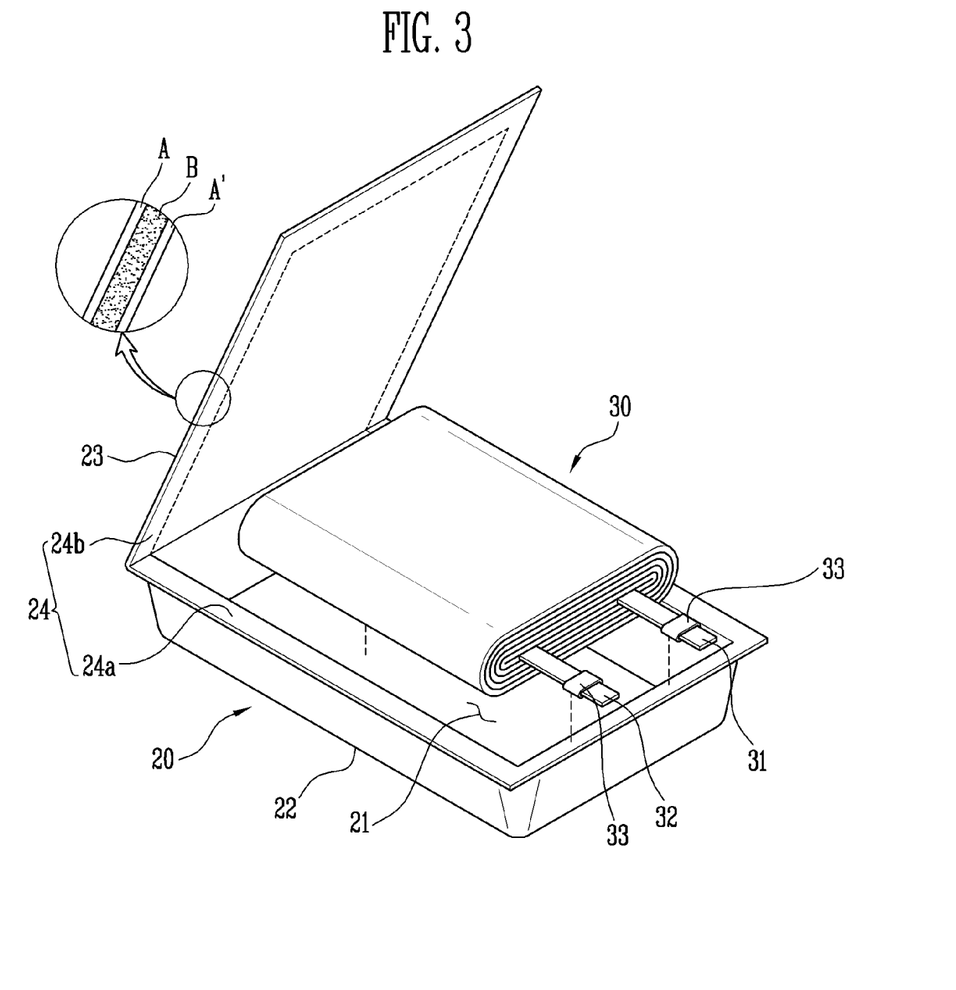
FIG. 3 is a perspective view of a battery case and an electrode assembly.

Turning now to FIGS. 1-3, FIG. 1 is a perspective view of a pouch-type secondary battery according to a first embodiment of the present invention, FIG. 2 is an exploded perspective view of FIG. 1 and FIG. 3 is a perspective view of a battery case and an electrode assembly.

The pouch-type secondary battery 100 according to this embodiment includes an electrode assembly 30 having first and second electrode plates and a separator interposed between the electrode plates, a battery case 20 having an accommodating portion (or body portion) 21 for accommodating the electrode assembly 30 and wing portions 24 provided along opposite edges of the accommodating portion 21, and an insulating member 110 provided to surround at least one part of each wing portion 24. The insulating member 110 has a bonding portion 120 provided thereon. The wing portions 24 are folded toward the accommodating portion 21, and the bonding portion 120 is interposed between the insulating member 110 and the accommodating portion 21 of the battery case 20. The bonding portion 120 may be a double-sided tape having an adhesive on both sides, but the present invention is not limited thereto. The insulating member 110 may be a tape having an adhesive on just one side, but the present invention is not limited thereto.

In the present invention, the insulating member 110 and the bonding portion 120 may be integrally provided. The combination of the insulating member and the bonding member may be referred to as the insulating member/bonding portion combination or simply an integrated tape or integrated tape arrangement.

The pouch-type secondary battery 100 may include the electrode assembly 30 and the battery case 20, and the battery case 20 may accommodate the electrode assembly 30 and an electrolyte in the accommodating portion 21 provided at an inside thereof. The electrode assembly 30 includes first and second electrode tabs 31 and 32 respectively connected to the first and second electrode plates, the first and second electrode tabs 31 and 32 may be extracted outward from the electrode assembly 30. For example, the first and second electrode plates may be positive and negative electrode plates, respectively. The first electrode tab 31 may be electrically connected to the positive electrode plate to serve as a positive electrode tab, and the second electrode tab 32 may be electrically connected to the negative electrode plate to serve as a negative electrode tab.

Electrochemical energy is generated when ions or electrons move between the first and second electrode plates. The electrochemical energy may be provided to the outside of the electrode assembly 30 through the first and second electrode tabs 31 and 32. Lead films 33 may be provided to the first and second electrode tabs 31 and 32, respectively. The electrode assembly 30 may be manufactured using various methods including winding or laminating the first and second electrode plates and the separator together, and the like.

The battery case 20 may include a back portion 22 having the accommodating portion 21 provided thereto and a front portion 23 attached to the back portion 22 to cover the accommodating portion 21. The pouch-type secondary battery 100 may be manufactured by placing the electrode assembly 30 and the electrolyte within the accommodating portion 21 of the back portion 22 and then thermally bonding edges 24a of the back portion 22 to edges 24b of the front portion 23 so that the back portion 22 and the front portion 23 are adhered closely to each other. The accommodating portion 21 may have a shape that corresponds to that of the electrode assembly 30. The accommodating portion 21 may be provided to the back portion 22 through deep drawing in which a hollow container with no joint is made using a flat plate.

The battery case 20 may include a plurality of layers including an internal resin layer A', a metal layer B and an external resin layer A. Here, the internal resin layer A', the metal layer B and the external resin layer A may be provided to be sequentially laminated. The internal resin layer A' directly faces the electrode assembly 30, and the external resin layer A may be an outermost surface of the secondary battery 20. The internal and external resin layers A' and A are used to prevent an electrical short circuit, or the like, and may be made out of a polymer resin, or the like, which is an electrical insulator. On the other hand, the metal layer B is provided between the internal and external resin layers A' and A, and serves to provide a predetermined mechanical strength to the battery case. For example, the metal layer B may be made out of aluminum or the like.

When the first and second electrode tabs 31 and 32 are extracted to the outside of the battery case 20, the first and second electrode tabs 31 and 32 may interfere with and prevent the wing portion 24 from being thermally bonded. Thus, the lead film 33 is further included on the wing portion 24 of the battery case 20, so that it is possible to prevent the sealing performance of the wing portion 24 from being lowered due to the electrode tabs 31 and 32.

For example, the first electrode tab 31 may include aluminum and the second electrode tab 32 may include nickel. While the first electrode tab 31 may have the same polarity as the metal layer B of the battery case 20, the second electrode tab 32 may have the opposite polarity to that of metal layer B of the battery case 20. Therefore, when the second electrode tab 32 comes in contact with the metal layer B exposed at an end of the battery case 20, particularly the wing portion 24, an electrical short circuit may occur. Further, the wing portion 24 may increase the volume of the pouch-type secondary battery 100, and may provide a less appealing external appearance of the pouch-type secondary battery 100. In order to address such a problem, the pouch-type secondary battery 100 according to this embodiment may have the insulating member 110 provided to the wing portion 24.

Typically, a pouch-type secondary battery is provided with a wing portion, and the wing portion may cause a problem of safety, such as a short circuit. In order to solve such a problem, the wing portion is insulated. In this case, the wing portion is insulated using a plurality of insulating members, and a separate adhesive is used so that the wing portion is fixed to a battery case. As such, the wing portion is insulated and attached through a multi-step process. This results in a complicated manufacturing process of the pouch-type secondary battery and a reduction of the external appearance of the pouch-type secondary battery, and therefore, the productivity of the pouch-type secondary battery is deteriorated.

This embodiment may provide the insulating member 110 which can allow the external appearance of the pouch-type secondary battery 100 to be pleasant and improve the productivity and yield in the manufacturing of the pouch-type secondary battery 100 by simplifying the manufacturing process. In the present invention, the insulating member 110 may be integrally provided with the bonding portion 120, and thus, the process of insulating the wing portion 24 and the process of fixing the wing portion 24 to the battery case 20 are not performed as separate processes but can be collectively performed by a single process. In the pouch-type secondary battery 100, the insulating member 110 may guide the wing portion 24 so that the wing portion is fixed at an exact position of the battery case 20, and thus it is possible to improve the productivity while minimizing a failure rate.

Figure 4A:
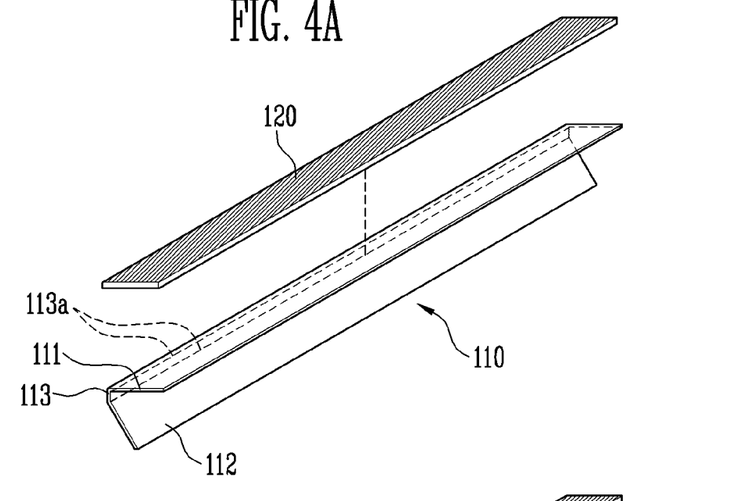
FIG. 4A is an exploded perspective view of an insulating member according to the first embodiment of the present invention.
Figure 4B:
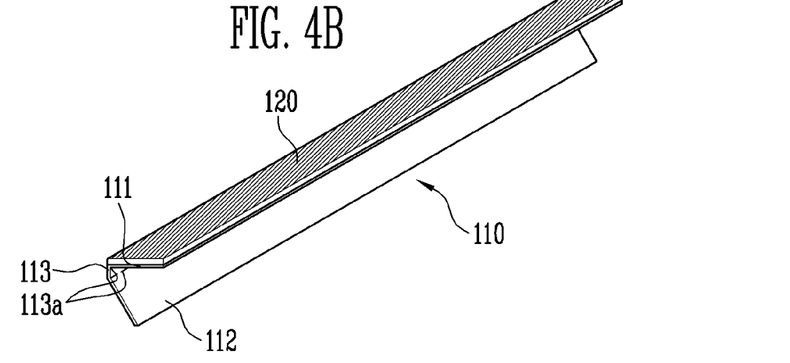
FIG. 4B is a perspective view of the insulating member according to the first embodiment of the present invention.
Figure 5:
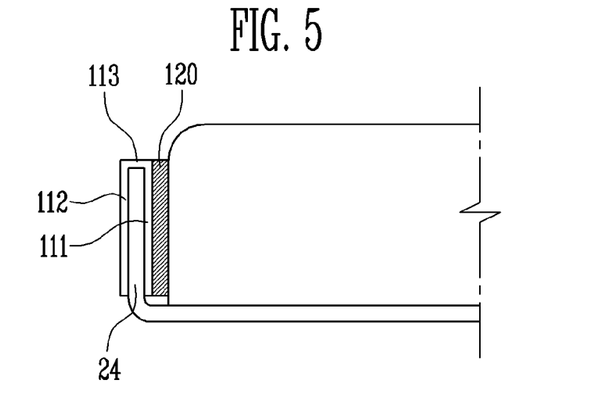
FIG. 5 is a close-up view of part X of FIG. 1.

Turning now to FIGS. 4A, 4B and 5, FIG. 4A is an exploded perspective view of an insulating member according to the first embodiment of the present invention, FIG. 4B is a perspective view of the insulating member according to the first embodiment of the present invention and FIG. 5 is a close-up view of part X of FIG. 1.

Referring to FIGS. 4A to 5, the insulating member 110 may be provided to surround both surfaces of the wing portion 24. The insulating member 110 includes a buffer portion 113 provided to an inside thereof, and the buffer portion 113 may be provided to correspond to an end of the wing portion 24. For example, the width of the buffer portion 113 may be provided to correspond to the thickness of the wing portion 24. The insulating member 110 may be divided into first and second portions 111 and 112 with the buffer portion 113 arranged therebetween at a center. In the first embodiment, the first and second portions 111 and 112 may be provided to have the same size. Folding lines 113a may be provided between the buffer portion 113 and each of the first and second portions 111 and 112, respectively, and the first and second portions 111 and 112 may be bent in the same direction based on the folding lines 113a. The first and second portions 111 and 112 of the insulating member 110 are provided to surround the wing portion 24, and may be provided to have a size corresponding to that of the major surfaces of the wing portion 24.

Each wing portion 24 may be folded towards the back portion 22 in order to minimize the volume of the pouch-type secondary battery 100. That is, each wing portion 24 having an insulating member 110 may be folded so that it comes into contact with the outside of the accommodating portion 21 of the battery case 20. The insulating member 110 is integrally provided with the bonding portion 120, and the bonding portion 120 enables the wing portions 24 to be firmly fixed to the battery case 20. When the insulating member 110 has an adhesive on one side, the side bearing the adhesive is attached to the wing portions 24. When the bonding portion 120 includes a double sided tape having an adhesive on both sides, the bonding portion 120 can be attached to the first portion 111 of the insulating member 110 to form an integrated tape arrangement. Upon folding of the wing portions 24 towards the accommodating portion 21 of the battery case, an adhesive on an exposed side of the bonding portion 120 attaches the wing portion 24 to the accommodating portion 21 upon contact. By completing formation of the integrated tape arrangement prior to attachment of the integrated tape arrangement to the wing portions 24 of the battery case, the manufacturing process of the battery can be simplified so that it is less prone to errors.

Hereinafter, other embodiments of the present invention will now be described with reference to FIGS. 6A to 7B. In these embodiments, components other than those mentioned in the following description are similar to those in the first embodiment described in FIGS. 1 to 5, and therefore, their detailed descriptions will be omitted.

Figure 6A:
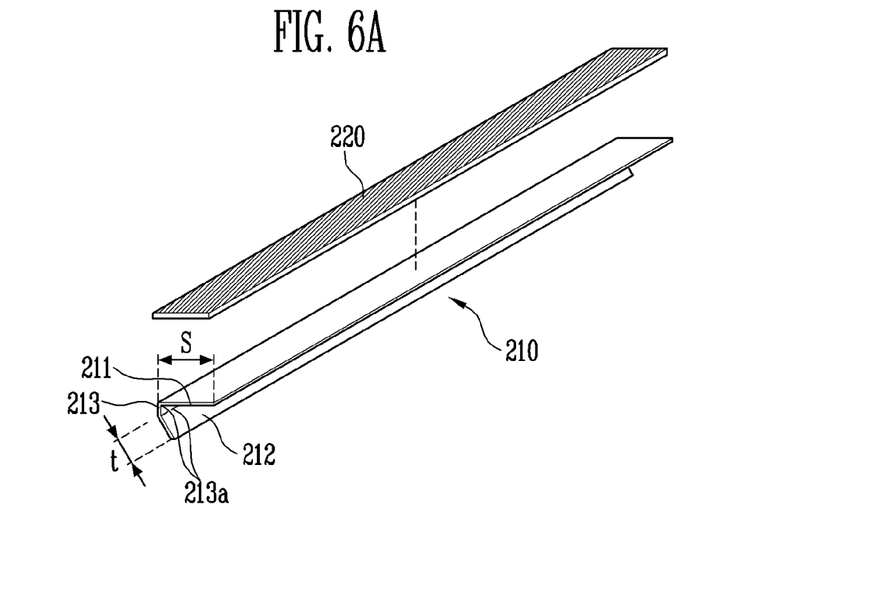
FIG. 6A is an exploded perspective view of an insulating member according to a second embodiment of the present invention.
Figure 6B:
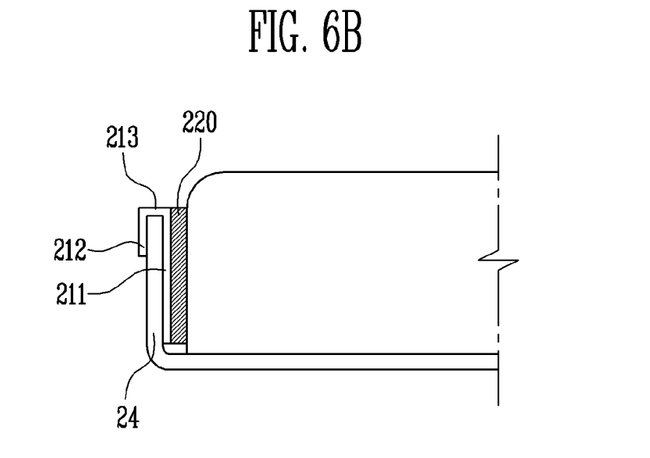
FIG. 6B is a plan view of a pouch-type secondary battery according to the second embodiment of the present invention.

Turning now to FIGS. 6A and 6B, FIG. 6A is an exploded perspective view of an insulating member according to a second embodiment of the present invention and FIG. 6B is a close-up view of a portion of the pouch-type secondary battery corresponding to part X of FIG. 1, but instead including the insulating member according to the second embodiment of the present invention.

Referring to FIGS. 6A and 6B, in the pouch-type secondary battery according to the second embodiment, a wing portion 24 of the battery case 20 may be provided so that at least one part of the wing portion 24 is surrounded by an insulating member 210. The insulating member 210 may further include a bonding portion 220 integrally provided therewith. The insulating member 210 may be arranged on both major surfaces of the wing portion 24, and the wing portion 24 may be bent to be fixed to the battery case 20. The bonding portion 220 is interposed between the insulating member 210 and the battery case 20 so that the wing portion 24 can be firmly fixed to the battery case 20.

The insulating member 210 may include a buffer portion 213 provided to the inside thereof and first and second portions 211 and 212 respectively extended to both sides from the buffer portion 213. The first and second portions 211 and 212 may be bent in the same direction from a folding lines 213a of the buffer portion 213. The first portion 211 of the insulating member 210 has the bonding portion 220 provided thereto, and the bonding portion 220 is provided between the wing portion 24 and the battery case 20. The second portion 212 of the insulating member 210 may be provided to cover the outer surface of the wing portion 24.

In the second embodiment of the present invention, the width S of the first portion 211 of the insulating member 210 having the bonding portion 220 provided on the insulating member 210 may be greater than the width t of the second portion 212 of the insulating member 210. That is, the first portion 211 of the insulating member 210 may be provided to have a size corresponding to that of each of the wing portion 24 and the bonding portion 220. In this case, the first portion 211 and the bonding portion 220 of the insulating member 210 are provided to have the size corresponding to that of the wing portion 24, so as to maintain the fixing force between the wing portion 24 and the battery case 20. On the other hand, the second portion 212 of the insulating member 210 is provided to have a size smaller than that of the wing portion 24, so that it is possible to reduce material cost of the pouch-type secondary battery.

Figure 7A:
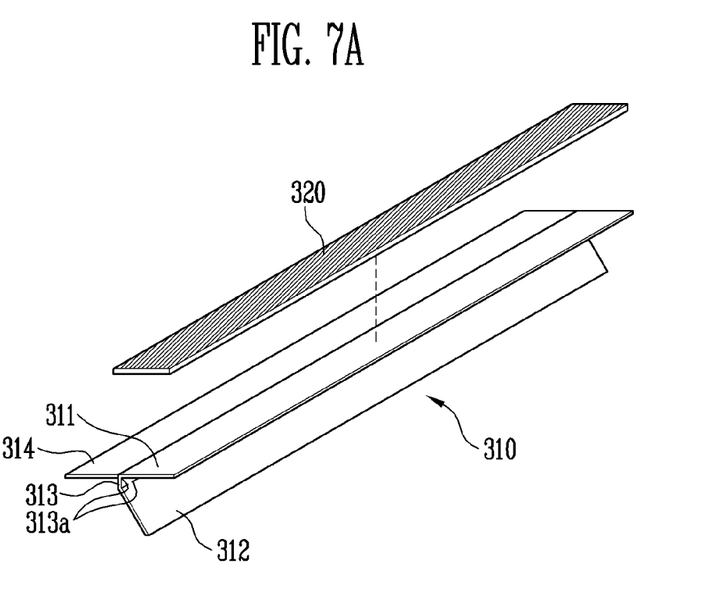
FIG. 7A is an exploded perspective view of an insulating member according to a third embodiment of the present invention.
Figure 7B:
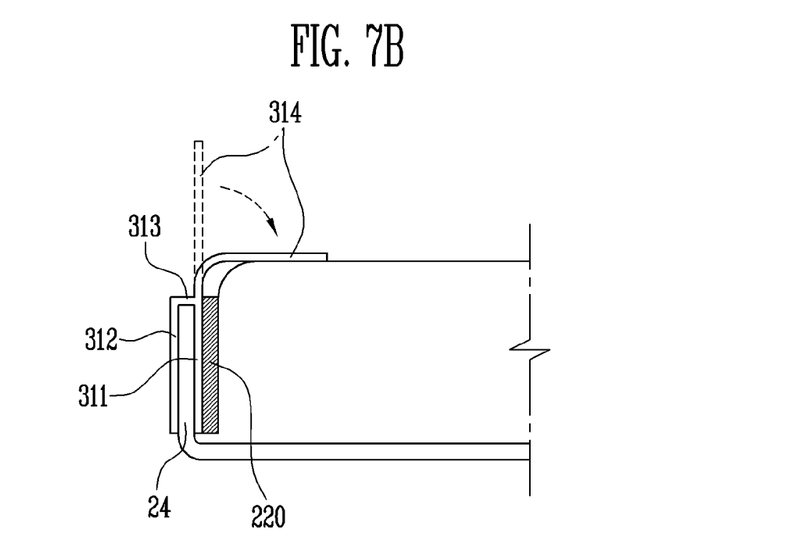
FIG. 7B is a plan view of a pouch-type secondary battery according to the third embodiment of the present invention.

Turning now to FIGS. 7A and 7B, FIG. 7A is an exploded perspective view of an insulating member according to a third embodiment of the present invention and FIG. 7B is a plan view of a pouch-type secondary battery according to the third embodiment of the present invention.

Referring now to FIGS. 7A and 7B, the pouch-type secondary battery may include an insulating member 310 and a wing portion 24. The insulating member 310 may be provided to surround both major surfaces of the wing portion 24, and the wing portion 24 may be bent toward the battery case 20 so as to be fixed to the battery case 20. The insulating member 310 may further include a bonding portion 320 interposed between the wing portion 24 and the battery case 20.

The insulating member 310 may include a buffer portion 313 provided to the inside thereof, where the first and second portions 311 and 312 respectively extend from both sides of the buffer portion 313. Folding lines 313a may be provided between the buffer portion 313 and each of the first and second portions 311 and 312. In the third embodiment of the present invention, the insulating member 310 further includes a third portion 314 that also extends from the buffer portion 313.

The first and second portions 311 and 312 of the insulating member 310 may be provided to cover the wing portion 24, and the third portion 314 may be extended in a direction opposite to the wing portion 24. The buffer portion 313 may be provided to correspond to an end portion of the wing portion 24. The first and second portions 311 and 312 of the insulating member 310 cover opposing major surfaces of the wing portion 24, and the wing portion 24 can be firmly fixed to the battery case 20 by the bonding portion 320 provided on the first portion 311 of the insulating member 310. Subsequently, the third portion 314 of the insulating member 310 is provided to surround the battery case 20 once more, so that the wing portion 24 can be more firmly fixed to the battery case 20.

Figure 8A:
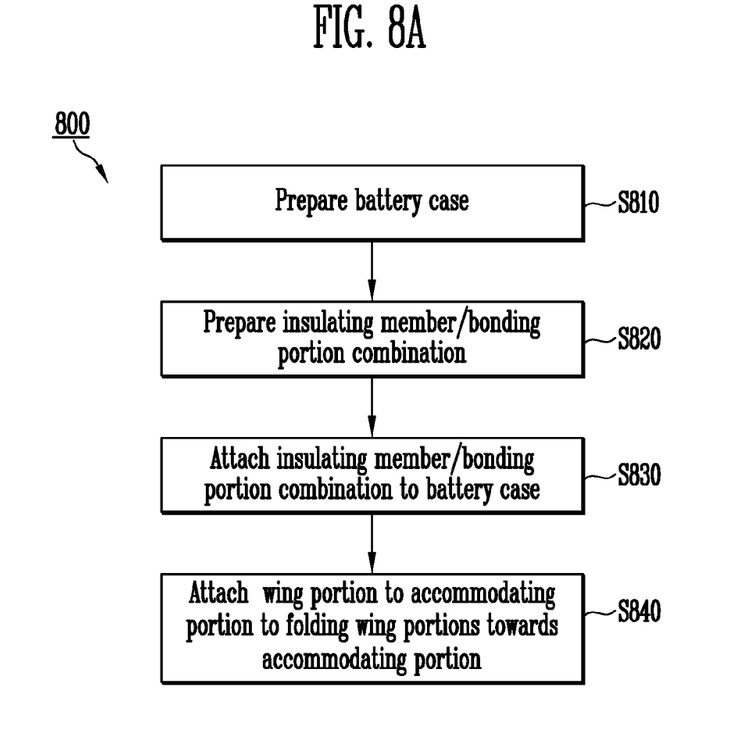
FIG. 8A is a view of a flowchart illustrating the overall method of manufacturing the battery according to the principles of the present invention.
Figure 8B:
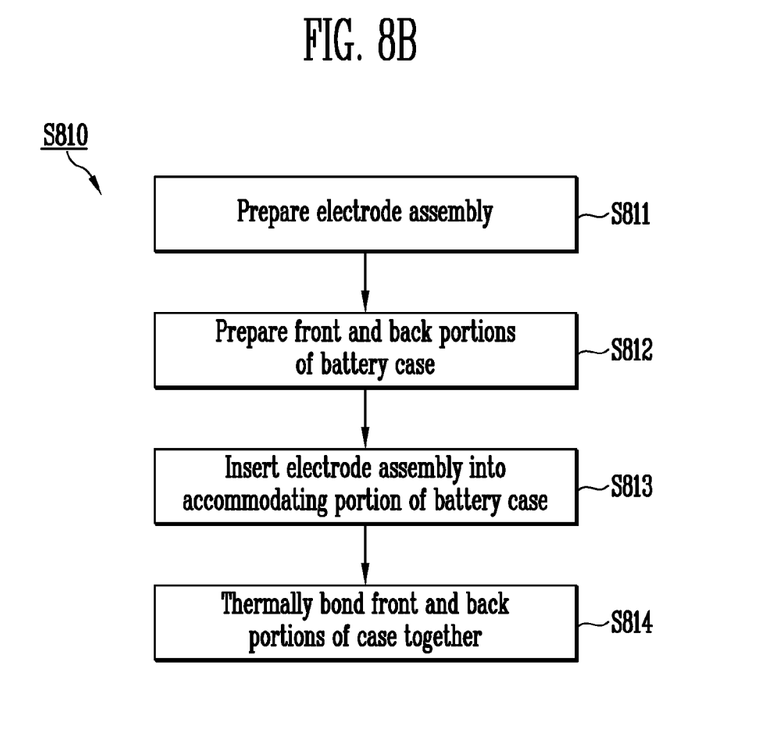
FIG. 8B is a view of a flowchart of the processes performed in the preparation of the battery case step of FIG. 8A.
Figure 8C:
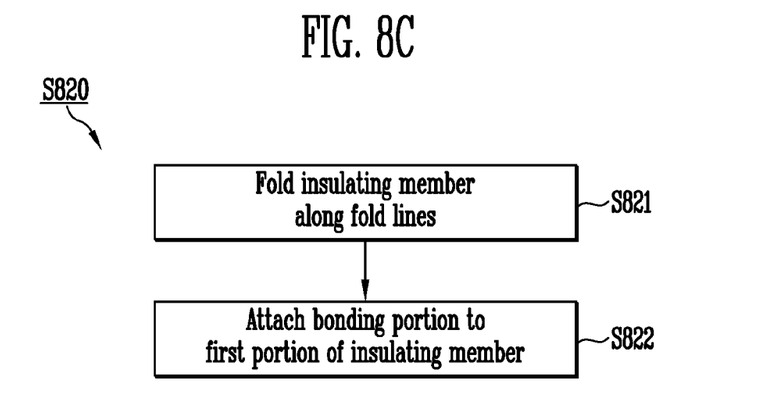
FIG. 8C is a view of a flowchart of the processes performed in the preparation of the insulating member/bonding portion combination step of FIG. 8A.

Turning now to FIGS. 8A through 8C, FIG. 8A is a flowchart showing a manufacturing method 800 of manufacturing the secondary battery according to the principles of the present invention, FIG. 8B is a flowchart illustrating the processes performed in step S810 in FIG. 8A and FIG. 8C is a flowchart illustrating the processes performed in step S820 of FIG. 8A.

Referring now to FIG. 8A, the method 800 includes preparation of the battery case in step S810, preparation of the insulating member/bonding portion combination (i.e., integrated tape arrangement) in step S820, attachment of the insulating member/bonding portion combination to the wing portions of battery case in step S830 and then attaching the wing portions to the accommodating portion by folding the wing portions in step S840. As can be seen from the flow chart 800 of FIG. 8A, the bonding portion 120/220/320 is combined with the insulating member 110/210/310 prior to attachment of either the insulating member or the bonding portion to the battery case 20. As a result, the manufacturing process is simplified and the generation of errors during the manufacturing process is reduced to a minimum so that manufacturing yield can be maximized.

Turning now to FIG. 8B, FIG. 8B shows the individual process steps included within step S810 of FIG. 8A, which is the preparation of the battery case 20. First, in step S811, the electrode assembly 30 is prepared by laminating an electrode on both sides of a separator. Step S811 may further include winding the laminate together to produce a wound electrode assembly if a wound electrode assembly is desired. Step S811 can also include the attachment of lead films 33 onto each of the electrode tabs 31 and 32 at a location where the electrode tabs 31 and 32 extend through the battery case 20. In step S812, the front and back portions 23 and 22 of the battery case 20 are prepared by laminating a resin layers A and A' on both sides of a metal layer B, but this step is in no way so limited. Furthermore, the laminate can be shaped to produce an accommodating portion 21 within the back portion 22 of the battery case 20. In step S813, the electrode assembly 30 is inserted into the accommodating portion 21 of the back portion 22 of the battery case 20. An electrolyte may also be included within the accommodating portion 21. In step S814, the front and back portions of the battery case are thermally bonded together to produce wing portions 24 and to seal the electrode assembly within. Upon completion of the preparation of the battery case, the wing portions 24 on either side of the accommodating portion 21 are present.

Turning out of FIG. 8C, the processes performed within step S820 of preparing the insulating member/bonding portion combination begins with folding the insulating members 110, 210, 310 along the fold lines 113a, 213a, 313a as illustrated in FIGS. 4A, 4B, 6A and 7A. Next, the bonding portions 120, 220, 320 are attached to the first portion 111, 211, 311 of the insulating member in step S822. This attachment of the bonding portion to the insulating members occurs prior to attachment of the integrated tape arrangement to the battery case. Because the bonding portion is attached to the insulating members prior to when the integrated tape arrangement is attached to the battery case, there is less risk of error in the manufacturing process of the secondary battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pouch-type secondary battery, comprising:
an electrode assembly including a pair of electrodes separated from each other by a separator;
a battery case including a front portion bonded to a back portion to produce wing portions at opposite edges of the battery case, the electrode assembly being arranged within an accommodating portion of the battery case, the accommodating portion being arranged between the wing portions, each wing portion of the battery case having a first side facing the accommodating portion and a second and opposite side facing away from the accommodating portion;
an insulating member arranged at each of said wing portions of the battery case and covering both the first and second sides of each of the wing portions; and
a bonding portion arranged at each of said wing portions to attach said wing portions to the accommodating portion of the battery case, the bonding portion being arranged between the first side of the wing portion and the accommodating portion of the battery case.

2. The battery of claim 1, further comprised of the bonding portion being integrally provided with the insulating member.

3. The battery of claim 2, the bonding portion being a double sided tape having an adhesive on both sides and the insulating member being a tape having an adhesive on only one side.

4. The battery of claim 1, wherein each bonding portion adheres a corresponding one of the wing portions to the accommodating portion.

5. The battery of claim 1, the insulating member comprises:
a first portion that covers the first side of the wing portion;
a second portion that covers an entirety of the second side of the wing portion; and
a buffer portion arranged over an edge portion of the wing portion and being connected to each of the first and second portions at fold lines.

6. The battery of claim 5, wherein the insulating member further comprises a third portion extending from the buffer portion in a direction opposite to that of the wing portion and being arranged on the accommodating portion of the battery case.

7. The battery of claim 5, wherein a size of the bonding portion corresponds to a size of each of the first side of the wing portion and the first portion of the insulating member.

8. The battery of claim 1, the insulating member comprises:
a first portion that covers the first side of the wing portion;
a second portion that covers only a portion of the second side of the wing portion; and
a buffer portion arranged over an edge portion of the wing portion and being connected to each of the first and second portions at fold lines.

9. The battery of claim 8, wherein a size of the bonding portion corresponds to a size of each of the first side of the wing portion and the first portion of the insulating member.

10. The battery of claim 1, further comprising:
electrode tabs extending to an outside of the battery case and being electrically connected each of ones of electrode plates of the electrode assembly; and
lead films arranged around a portion of the electrode tabs that extend through the battery case to electrically insulate the electrode tabs from the battery case.

11. The battery of claim 1, each of the front portion and the back portion being a laminate including a metal layer arranged between two resin layers.

12. The battery of claim 1, the bonding portion being a double sided tape having an adhesive on both sides.

13. A method of manufacturing a pouch-type secondary battery, comprising:

preparing an electrode assembly by laminating an electrode on each side of a separator;
preparing front and back portions of a battery case, the back portion having an accommodating portion;
inserting the electrode assembly and an electrolyte into the accommodating portion;
sealing the electrode assembly within by thermally bonding edge portions of the front portion to edge portions of the back portion to produce wing portions;
providing a pair of integrated tape members, each integrated tape member includes a bonding portion integrally provided with an insulating member;
attaching the pair of integrated tape members to respective wing portions of the battery case; and
attaching the wing portions of the battery case to the accommodating portion of the battery case by folding the wing portions having the integrated tape members arranged thereon towards the accommodating portion, each wing portion of the battery case having a first side facing the accommodating portion and a second and opposite side facing away from the accommodating portion, each insulating member covering both the first and second sides of each of the wing portions, each bonding portion being arranged between the first side of one of the wing portions and the accommodating portion of the battery case.

14. The method of claim 13, the providing the pair of integrated tape members comprises:
providing the pair of insulating members;
forming first and second portions for each insulating member by folding each insulating member along fold lines; and
attaching the bonding portions to the first portions of each insulating member.

15. The method of claim 14, further comprising attaching a third portion of each insulating member to the accommodating portion of the battery case.

16. The method of claim 14, a size and a shape of each bonding portion and the first portion of each insulating member being the same as a size and a shape of each wing portion of the battery case.

17. The method of claim 14, the bonding portion being a double sided tape having an adhesive on both sides to fasten and adhere the wing portions to the accommodating portion of the battery case.

18. The method of claim 13, further comprising attaching lead films to electrode tabs of the electrode assembly prior to said thermal bonding.

* * * * *